United States Patent
Dageville et al.

(10) Patent No.: US 10,671,605 B2
(45) Date of Patent: Jun. 2, 2020

(54) MANAGING PERSISTENT DATABASE RESULT SETS

(71) Applicant: SNOWFLAKE INC., San Mateo, CA (US)

(72) Inventors: Benoit Dageville, Foster City, CA (US); Jiansheng Huang, Palo Alto, CA (US); Shige Takeda, Foster City, CA (US); Abdul Q. Munir, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 730 days.

(21) Appl. No.: 15/097,107

(22) Filed: Apr. 12, 2016

(65) Prior Publication Data

US 2017/0293626 A1    Oct. 12, 2017

(51) Int. Cl.
| | |
|---|---|
| *G06F 16/2453* | (2019.01) |
| *G06F 16/14* | (2019.01) |
| *G06F 16/2455* | (2019.01) |
| *G06F 16/11* | (2019.01) |
| *G06F 16/16* | (2019.01) |

(52) U.S. Cl.
CPC ...... *G06F 16/24539* (2019.01); *G06F 16/125* (2019.01); *G06F 16/156* (2019.01); *G06F 16/162* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,302,425 B1 * | 11/2007 | Bernstein | G06F 17/30457 |
| 2006/0069664 A1 * | 3/2006 | Ling | G06F 16/90335 |
| 2010/0198855 A1 * | 8/2010 | Ranganathan | G06F 17/30445 707/764 |
| 2013/0191371 A1 * | 7/2013 | Poznanski | G06F 17/30864 707/722 |
| 2015/0142778 A1 * | 5/2015 | Bilinski | G06F 16/2455 707/722 |

* cited by examiner

*Primary Examiner* — Neveen Abel Jalil
*Assistant Examiner* — John J Morris
(74) *Attorney, Agent, or Firm* — Womble Bond Dickinson (US) LLP; Daniel E. Ovanezian

(57) ABSTRACT

A method, system, and apparatus for managing a persistent query result set are disclosed. A resource manager is disclosed that receives a query from a client over a computer network. A computer database server is disclosed that executes the query and generates a result set based on and in response to the received query. An execution platform is disclosed that divides the result set into a plurality of chunks, wherein each chunk comprises a portion of the generated result set. The resource manager adds metadata to each of the plurality of chunks. A first chunk of the plurality of chunks comprises metadata pointing to the plurality of chunks. The resource manager delivers at least the first chunk of the plurality of chunks to the client in response to the query. The execution platform offloads the remaining plurality of chunks to cloud storage in parallel.

61 Claims, 10 Drawing Sheets

EXAMPLE OF A NEW RESULT JSON

350

```
{
    "data": {
        "parameters": [...],
        "rowtype": [...],
        "first_chunk": [
            [ string/null, string/null, ...
            ]
        ],
        "additional_chunks" : [
            {"presigned-url" : "http://aws.amazon.com/bucket/path",
                "startRow" : 1000, -- base 0
                "endRow" : 10999}
            {"presigned-url" : "http://aws.amazon.com/bucket/path",
                "startRow" : 11000, -- base 0
                "endRow" : 11999}
            ...
        ]
        "job_id" : xyz
        "end_of_result" : true/false
        "total" : [number] -- total number of rows produced by the query
        "returned" : [number] -- number of rows returned by the query (including rows in additional chunks)
    }
    "code":"..."
    "message":"...",
    "success":true/false
}
```

FIG. 3B

MANAGING PERSISTENT DATABASE RESULT SETS

TECHNICAL FIELD

The present disclosure relates to resource management systems and methods for managing a persistent query result set in data storage devices and computing resources related to data management in data storage devices.

BACKGROUND

When working with large volumes of data, there are often situations when a portion of the data is relevant for a given task. In those situations, one or more queries are run on a database server to generate the relevant result set from data storage devices. Many diverse retrieval and data storage systems are available today from many different providers. However, these retrieval and data storage systems do not support persistent result sets or handle large result sets efficiently that are more than a few hundred megabytes because it is streamed from the data server to a client. Further, these retrieval and data storage systems cannot disconnect from the database server until after a client has consumed the result set at the end of the query, otherwise there is no way to get back to or obtain the result set.

While some retrieval and data storage systems attempt to handle a persistent or large result set, there are drawbacks with these systems. For example, the query and retrieval of the result set is often slow because the query is sent to, and entire result set is sent back from, the database server in one computer network pipe. In addition, existing retrieval and data storage systems produce the result set sequentially.

Another potential drawback of existing retrieval and data storage systems include the fact that a database server has limited resources. Such server resources cannot be freed up to run new queries until the result set is fully consumed by the client, such that the process is at least partially dependent upon how fast the client can consume the result set. Thus, because query execution on the database server side is tightly coupled with the consumption of the result on the client side, queries can only be run as fast as a client can consume result sets. This process may be further slowed when queries are run over a network. Further, existing retrieval and data storage systems require a significant amount of resources that must be held on the database server to support delivery of a large result set, until delivery of the result set to the client is complete. Since this process may be very slow, it is inefficient to produce and consume such large result sets. Thus, existing database servers and systems are significantly limited.

Additionally, existing retrieval and data storage systems do not allow for fast scrolling of a large result set (e.g., via a cursor mechanism). Accordingly, it is expensive for a client because there is no skipping over data that a user is not interested in. Thus, it is inefficient to produce and consume such large result sets.

Another potential drawback of existing retrieval and data storage systems include the fact that result consumption is synchronous. The user has to consume the result set from the same machine and client where a query is submitted or initiated. Additionally, the user has to consume the result set at the time when the query produces the result set. Otherwise, the result set will be lost and the query must be rerun. Thus, the user cannot go back to a result set after it has been produced.

Because result consumption is synchronous, other potential drawbacks of existing retrieval and data storage systems include the fact that query results cannot be audited and query results cannot be shared among different clients. Thus, there are significant drawbacks with existing retrieval and data storage systems.

The systems and methods described herein provide an improved approach to handling persistent or large result sets in retrieval and data storage systems, which alleviates one or more of the above-identified limitations of the existing systems.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 3B illustrates a result JSON string comprising a URL, rowCount, compressedSize and uncompressedSize for each chunk in accordance with the teachings and principles of the disclosure;

DETAILED DESCRIPTION

Figure 1:
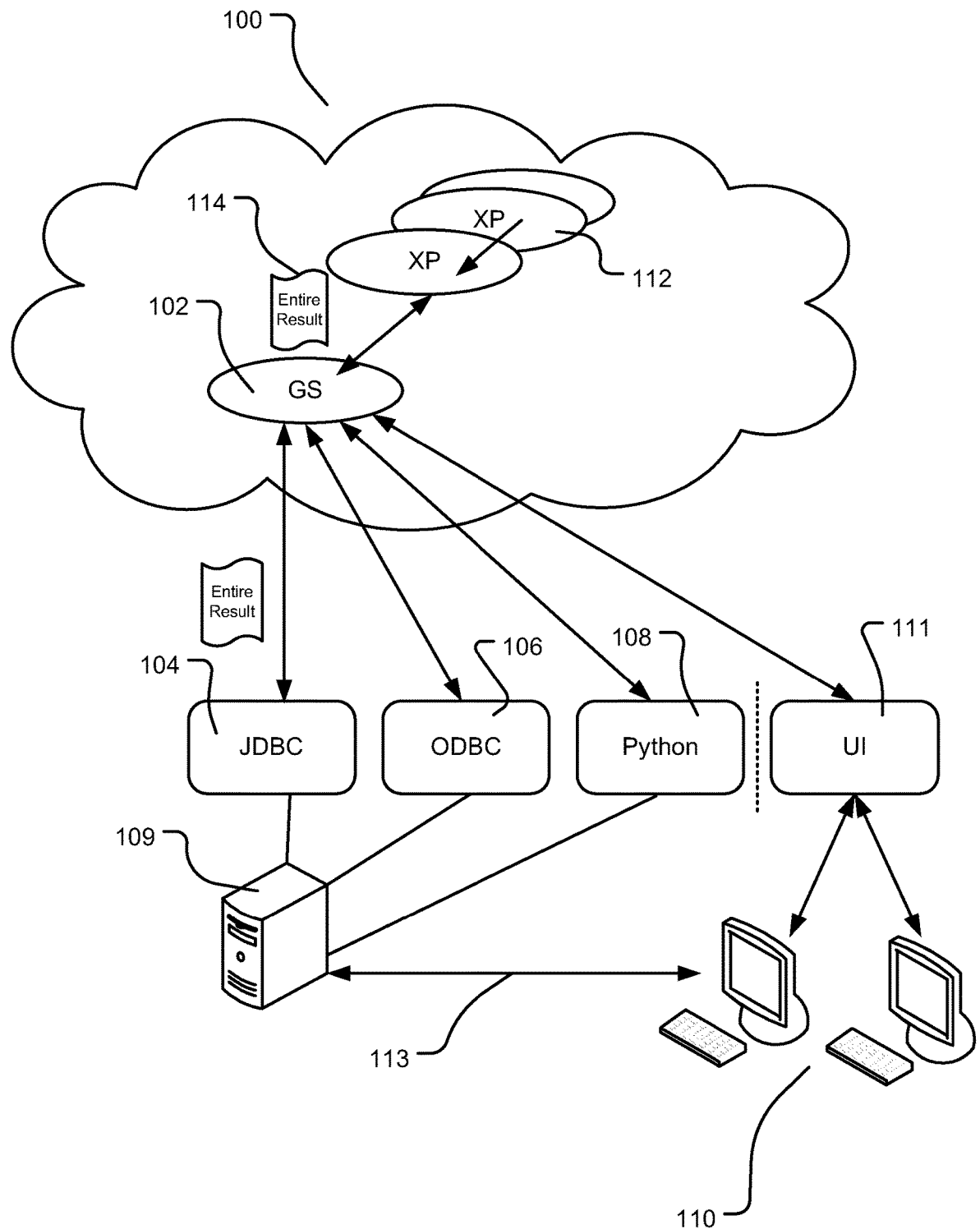
FIG. 1 is an example of a retrieval and data storage system.

In the following disclosure, cloud infrastructure may be used and leveraged for efficient and flexible delivery of database query result sets. Cloud companies, such as Amazon Web Services, Google Cloud Storage, AT&T's Synaptic cloud storage service and others, offer scalable storage as a service, which can be accessed by both a database server and its client. The technology of the disclosure may produce a query result set for consumption by a user by offloading at least a portion of the result set through dividing the result set into a plurality of chunks into the cloud storage via its service API (application programming interface). The technology of the disclosure may utilize metadata and return pointers that are added to the plurality of chunks in the result set response and return at least a first chunk comprising the return pointers and metadata for each of the plurality of chunks to a user or client. The client can then access the result chunks directly from the cloud storage via its service API.

The technology of the disclosure frees up a database server to do what it is best at, which is running database queries, thereby increasing a database server's utilization. In addition, by leveraging the high performance and scalability of cloud storage, a user or client can read back the result set more quickly with the ability to download result chunks in parallel. The technology of the disclosure also enables asynchronous result consumption and result auditing.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one implementation," "an implementation," "one example" or "an example" means that a particular feature, structure or characteristic described in connection with the embodiment, implementation or example is included in at least one embodiment of the present disclosure. Thus, appearances of the phrases "in one embodiment," "in an embodiment," "in one implementation," "in an implementation," "one example" or "an example" in various places throughout this specification are not necessarily all referring to the same embodiment, implementation or example. Furthermore, the particular features, structures, databases or characteristics may be combined in any suitable combinations and/or sub-combinations in one or more embodiments, implementations, or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud" or "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams that are part of the accompanying figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein further provide a multi-tenant system that supports isolation of computing resources and data between different customers/clients and between different users within the same customer/client.

Referring now to FIG. 1, there is illustrated an example of an existing retrieval and data storage system. As previously noted, existing retrieval and data storage systems cannot handle a result set that is more than a few hundred megabytes since the result set is buffered in the database server. Existing retrieval and data storage systems, such as 100, may comprise a global service (GS) 102 that communicates and interacts with various application programming interfaces (APIs) or database connectors 104, 106, 108, such as a Java database connector (JDBC), or an open database connector (ODBC), or a Python database API. It will be appreciated that the JDBC technology is an API for the Java programming language that defines how a client may access a database. It provides methods for querying and updating data in a database. The ODBC technology is a standard programming language API for accessing database management systems. The ODBC technology may be considered independent of any particular database system or operating system. The Python database API provides a "database neutral" programming interface for databases, such as MySQL, PostgreSQL, SQLite, MS-SQL and Oracle and is based on the structured query language SQL, for example. The APIs or the database connectors may be run on a computing device 109, which may be a server or computer work station. The computing device 109 may be in communication over a network interface 113 or otherwise with a second computing device 110, which may be a server or computer work station, which may include a user interface 111. It will be appreciated that the embodiments disclosed herein may be used in connection with any database connector or API without departing from the scope of the disclosure.

As illustrated, the GS 102 may also communicate and interact with the client user interface (UI) 111. A user may run a query from a client work station 110, which query will be received by the GS 102. The GS 102 may send the query to an execution platform 112. The execution platform (XP) 112 may execute the query and generate a result set 114. In existing retrieval and data storage systems, such as 100, the query and retrieval of the result set 114 is slow because the query is sent to, and entire result set 114 is sent back from, the execution platform 112 to the GS 102 and from the GS 102 to the client, either through the server 109 and/or directly to work station 110, in one computer network pipe. These existing retrieval and data storage systems, such as 100, also produce the result set 114 sequentially. Thus, because of limited resources of the database server, server resources cannot be freed up to run new queries until the result set 114 is fully consumed by the client. This process may be further slowed when queries are run over a network.

Figure 2:
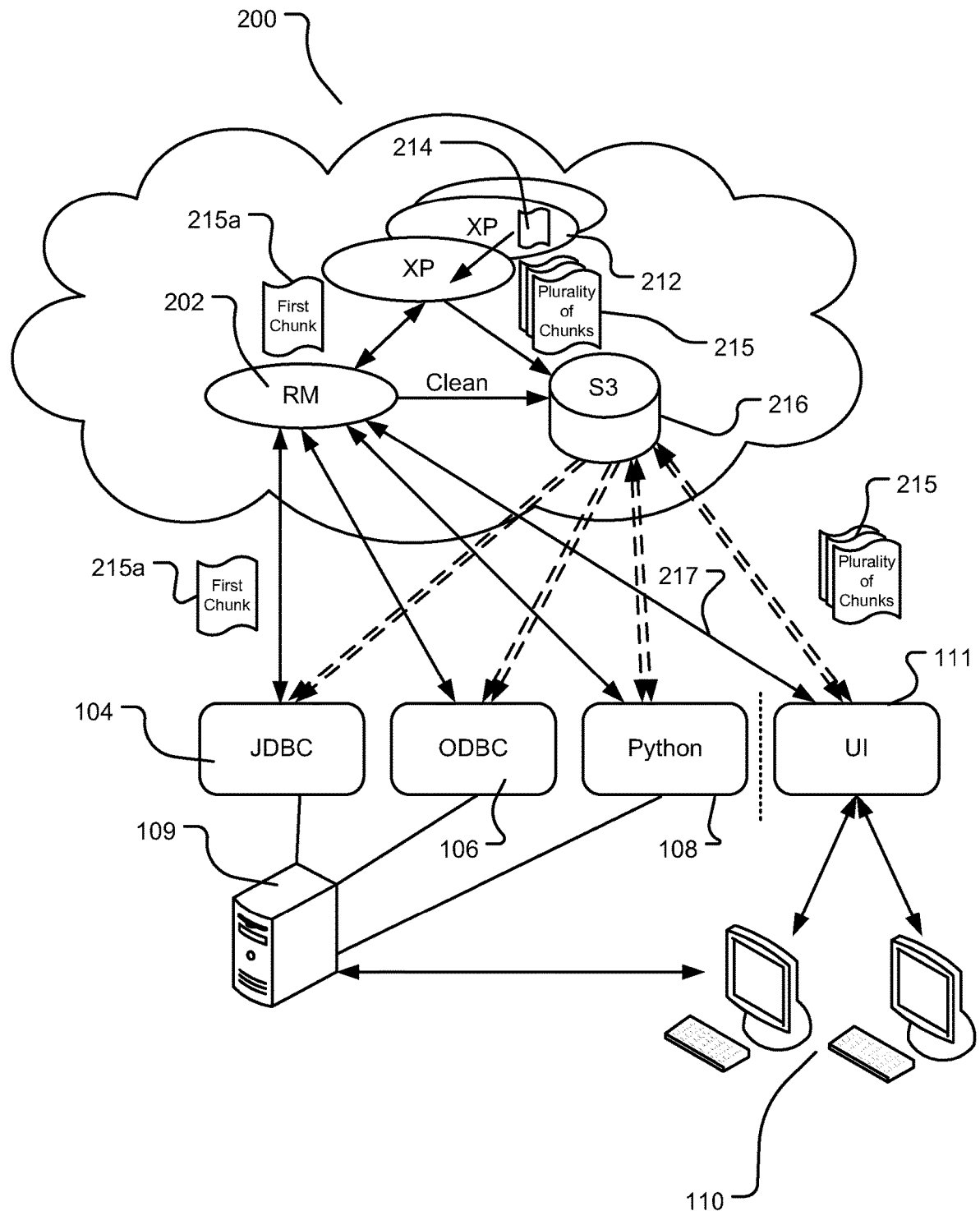
FIG. 2 illustrates an embodiment of a retrieval and data storage system leveraging cloud storage for persistent or large result sets by utilizing metadata in accordance with the teachings and principles of the disclosure.

Referring to FIG. 2, there is illustrated an embodiment of a retrieval and data storage system 200 in accordance with the teachings and principles of the disclosure that leverages cloud storage for storing result sets with metadata. The retrieval and data storage system 200 may be a networked computer system comprising processors, memory, and storage for processing and storing distributed sets of digital files that are distributed over a plurality of storage devices, wherein computer executable instructions for managing a persistent query result set 214 cause computer hardware to perform the executable instructions. The system 200 may comprise a resource manager module 202 that receives a query from a user computing device 109, such as from a server or directly from work station 110, over a computer network pipe (indicated by arrows in the drawing, such as pipe 217 or 317). In one embodiment, a computer network pipe is a one-way communication channel. In an embodiment, a computer network pipe denotes communication, or passing information from one process to another, where the pipe passes a parameter or information, such as the output of one process to another process that accepts it as input. In an embodiment, the system temporarily conveys the piped information until it is processed or consumed by the receiving process. The resource manager module 202 may send the query to an execution platform module 212 where the query is executed. The system 200 may also comprise a computer database server and various modules for performing data retrieval and storage tasks. The execution platform module 212 may itself comprise further modules therein for executing the query and generating a result set 214 based on and in response to the received query. The execution platform module 212 may divide the result set 214 into a plurality of chunks 215, wherein each chunk 215 comprises a portion of the generated result set 214. In an implementation, a chunk 215 may be a fragment of information, wherein each chunk contains a header that indicates some parameters, such as the type of chunk, comments, size or other identifiers. The chunk may also be a set of data sent to a processor or one of the parts of a computer for processing. For example, a sub-set of rows of a matrix. The resource manager module 202 may then add metadata to each of the plurality of chunks 215. The execution platform module 212 offloads the plurality of chunks 215 to cloud storage 216. It will be appreciated that a first chunk 215a of the plurality of chunks 215 may comprise metadata pointing to the remaining or other portions of the plurality of chunks 215, to thereby allow for the entire result set 214 to be delivered to the user or client over one or more computer network pipes. The plurality of chunks 215, other than the first chunk 215a, representing the remaining portion of the result set 214 is offloaded with respect to the computer network pipe through which the query was sent. It will be appreciated that the resource manager module 202 delivers at least the first chunk 215a of the plurality of chunks 215 to the client in response to the query for consumption by the user or client.

Figure 3A:
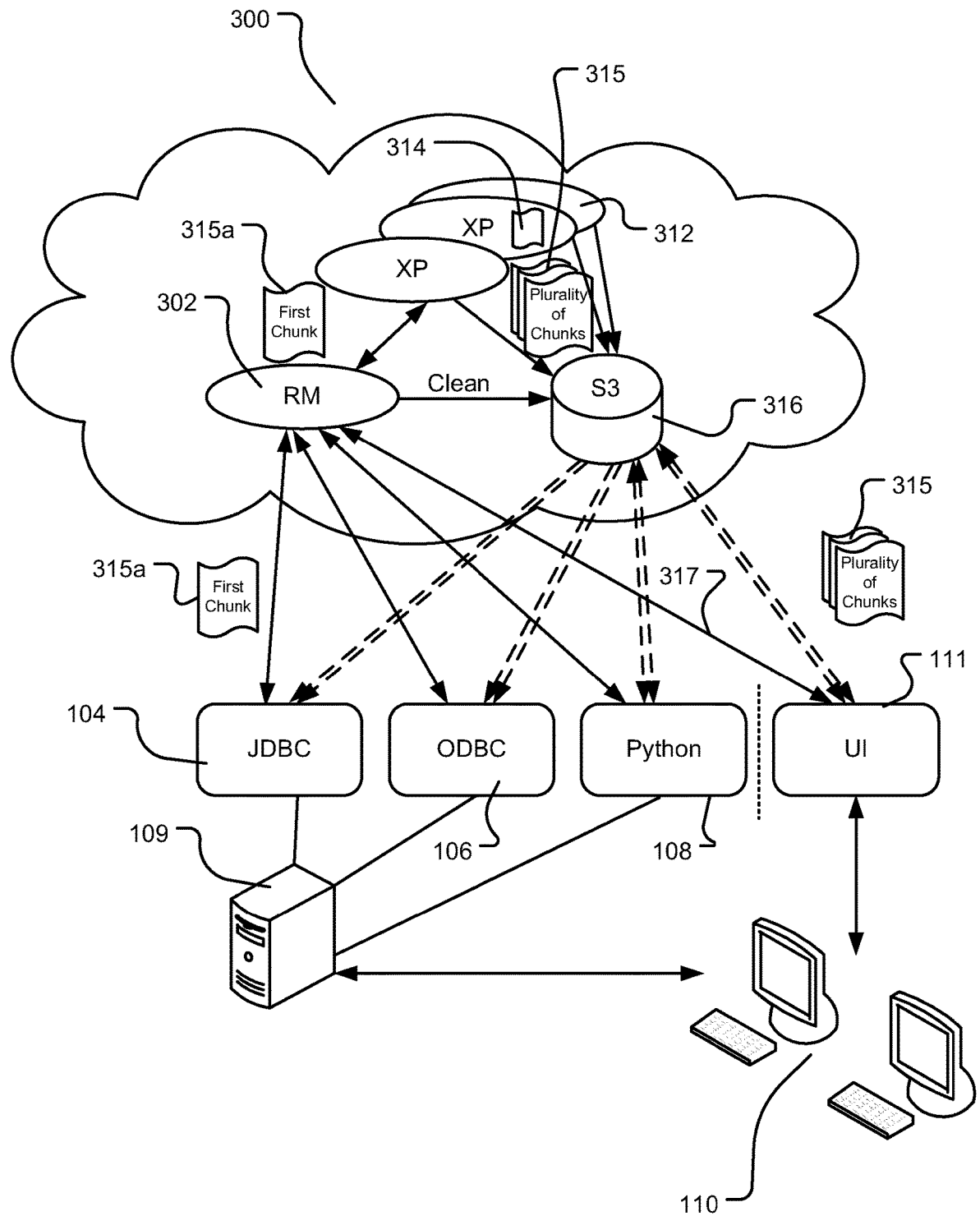
FIG. 3A illustrates an embodiment of a retrieval and data storage system leveraging cloud storage for persistent or large result sets that are produced and sent in parallel to cloud storage in accordance with the teachings and principles of the disclosure.

Referring now to FIG. 3A, there is illustrated an embodiment of a retrieval and data storage system 300 that leverages cloud storage, wherein result sets are produced and sent with metadata in parallel to cloud storage in accordance with the teachings and principles of the disclosure. The retrieval and data storage systems 200 and 300 are similar and share common elements and components. The major exception between systems 200 and 300 being that an execution platform module 312 in the retrieval and data system 300 illustrated in FIG. 3A may generate and offload the plurality of chunks 315 to cloud storage 316 in parallel. In either implementation of the system 200 or 300, the plurality of chunks 215 or 315, other than the first chunk 215a or 315a, representing the result set 214 or 314 is offloaded with respect to the computer network pipe over which the query was sent. The result is an increase in the speed of the system, such that the server may run additional queries. It will be appreciated that the resource manager module 202 or 302 delivers at least the first chunk 215a or 315a of the plurality of chunks 215 or 315 to the user or client in response to the query.

The resource manager module 302 may automatically add metadata to each of the plurality of chunks 315 as the plurality of chunks 315 of the result set 314 are being produced. In an implementation, the result set 314 may be formed into a collection. The collection may be used to maintain the metadata of the result set 314 and the number of files for the result set 314. The collection may have the following attributes. An attribute may include a job id for the result set 314. Another attribute may include a name of the result set 314, such as main, errors, and the like, which may be the same set for each type of SQL command. Another attribute may include an account in which the result set 314 has been created. Another attribute may include a time when the result set 314 is created. Another attribute may include a static metadata about the result set 314, such as parameters, column metadata, cloud storage (such as s3 or other cloud storage devices) result prefix, and the like. It will be appreciated that the static metadata may be stored as a JSON string. Another attribute may include compressed data for the first chunk 315*a* of rows. For the first chunk 315*a*, a size will be determined or picked for that is small enough to be stored in a database (such as FDB), but have enough rows to display. Another attribute may include additional chunks 315 that may be stored in cloud storage 316, such as s3, for the result set 314. Each of the additional chunks 315 can be fetched from cloud storage 316 by using a fixed path pattern. An example fixed path pattern may be: results/jobId/data_workerId_instanceId_fileId. All chunks 315 and the row counts within the chunks 315 may be recorded in manifest files that can found in the same directory. It will be appreciated that there may be other implementations that may also be used without departing from the scope of the disclosure. Another attribute may include a total number of rows produced by the query. Another attribute may include a number of rows returned by the query. This may be affected by the parameter ROWS_PER_RESULTSET.

It should be noted that the amount of information stored in a database (whether FDB or SQL) for the additional chunks 315 may be minimized because a query can generate a large result set 314. Additionally, the information stored in chunks 315 may be minimized because chunk size cannot be too large in order to support acceptable response time for client result paging. Further, the information stored in the plurality of chunks 315 may be minimized where there is a need to be able to support many queries. To minimize chunk information in the database, it is contemplated to store information for each chunk 315 in one or more manifest files in the same cloud storage, such as s3, location. In an implementation, manifest files may have a different prefix from the data files. Furthermore, the plurality of chunks 315 may be ordered by, for example, worker id, thread id, and chunk id, and row count for each of the plurality of chunks 315. The order is maintained in the manifest file. So to determine which file to fetch to support paging, the file index may be calculated based on the chunk order and row counts.

The result metadata indexed by job IDs is used to indicate whether the result set 314 has been stored or purged. For example, the result set is either present or not, such that if the result set is stored or purged then the metadata is also stored or purged with it. In another implementation, an attribute may be added to the metadata for indicating the result status. The result status may be stored as a Boolean having a binary variable with two possible values.

Referring briefly to the JSON string in FIG. 3B, there is illustrated an implementation of a result JSON result string 350 in accordance with the teachings and principles of the disclosure. The following fields may be added to the JSON string 350: (1) additional chunks: URL and row count for additional chunks 315 in addition to the first chunk 315*a*, they are sorted by their start row index; (2) end_of_result: to indicate whether this result set 314 is complete or not and whether a client needs to continue calling to get the result API for further data. For backward compatibility, it will be appreciated that the first chunk 315*a* in the result set 314 may include data from additional chunks 315 up to the limit that MAX_RESULT_SIZE allows. The merging of additional chunks 315 into the first chunk 315*a* for building a result set response may be done in the resource manager 302. In this manner, clients that do not support direct fetching from cloud storage 316, such as s3, will continue to get the same result set 314 as they would have gotten before.

In an implementation, APIs may be used for the execution platform module 312 to report information relating to the result set 314. For example, an API, such as /xp/{severId}/{jobId}/statement-result, may be used for posting the query result to the resource manager 302. By way of further example, an API, such as /xp/{severId}/{jobId}/success-report, may be used to report the number of rows in the result set 314. It will be appreciated that the statement-result API may be called as soon as the first chunk 315*a* is available instead of waiting until the end of the query. Additionally, the success-report API may also report the number of rows in the first chunk 315*a*. The resource manager 302 can compare the number of rows in the first chunk 315*a* and the number of returned rows for the query to know whether there are more or additional result chunks 315 in cloud storage 316, such as s3.

In an implementation, the result set 314 may be returned to clients via one of the following exemplary APIs. First, /queries: this is the API for clients to submit a query. Result sets may be returned as a response to this API if it runs shorter than the ping-pong interval between clients and the resource manager 302. Second, /queries/{queryId}/result: this API may only be used if a query takes longer than the ping-pong interval between clients and the resource manager 302. It will be appreciated that the/queries API may return an in-progress status if a query has not been completed. In an implementation of the systems and methods of the disclosure, the result set 314 may be streamed for consumption by the client. To achieve streaming, the resource manager module 302 may deliver at least the first chunk 315*a* of the plurality of chunks 315 to the user or client while at least one of the plurality of chunks 315 is being produced by the execution platform module 312. To support result streaming, the/queries API may return a partial result set 314 if it is already available even before a query is completed. The /queries/{queryId}/result set may return an error after a query has been finished. However, the API can return result sets 314 even after a query is completed. Given that the result API may be called in order for a client to obtain or receive additional chunks 315 or get the entire result set 314 again post-query completion, parameters (e.g., startingRowIndex and numberOfRows) may be added for a client to indicate which set of rows to include in the response. For performance reasons, the result set 314 may return a super set of what a client requests along with the adjusted parameters, such as startingRowIndex and numberOfRows. To support multiple results, a client can request a specific type of result set 314 by passing a parameter (resultName).

It will be appreciated that in an implementation of the disclosure, the query execution on the database server is decoupled from consumption of the result set 314 by the client. Accordingly, the result set 314 can be generated by the database server as fast as the database server can operate and achieve the generated result set 314. It will likewise be appreciated that generation of the result set 314 is therefore not limited by the speed of the client's consumption of the result set 314.

In an implementation of generating a result set 314, the first chunk 315*a* may be pushed from the execution platform module 312 to the resource manager module 302. This may be done via a statement-result API as soon as the first chunk 315a is produced, while the additional chunks 315 are offloaded or unloaded to cloud storage 316, such as s3 result stage area. The chunk data is compressed using, for example, gzip or other file compression techniques. The naming of the file will be through a result file pattern shared between the resource manager 302 and the execution platform 312. Pushing of result chunks 315 may be done asynchronously. Along with the chunk data, each worker process will generate a manifest file listing the chunk data files and the number of rows contained in the chunks 315.

The systems and methods of the disclosure enable the client, after downloading at least the first chunk 315a and associated metadata pointing to the corresponding plurality of chunks 315, to download one or more of the plurality of chunks 315 at a later time from cloud storage 316. Thus, the connection state between the client and the database server is flexible. Further, the execution platform module 312 may process the result set 314 in parallel in response to receiving the query even after the client is disconnected from the database server. Still further, the systems and methods of the disclosure enable the client to consume the result set 314 from a different computing machine than from which the query was sent.

In an implementation of generating result sets 315 in parallel, the execution platform module 312 may generate the result set 314 in parallel. The same number of RsoResult workers may be allocated with respect to what is used for a child RSO. It will be understood that an RSO Result is a row set operator that handles multiple result sets. A distribution method may be used to distribute rows from the child RSO worker to the result RSO worker to keep the result order. It will be appreciated that only the first worker instance will send the first chunk 315a to the resource manager 302, while all the other instances will offload the remaining chunks 315 of the result set 314 directly to cloud storage 316, such as s3 or other cloud storage.

In an implementation of the systems and methods of the disclosure, the plurality of chunks 315 may be delivered to the client simultaneously through multiple computer network pipes. In such a scenario, the result set 314 may be delivered asynchronously and in parallel, thereby decreasing the database server resource requirements and increasing the client's speed of retrieving the result set 314.

It will be appreciated that when the execution platform module 312 sends the result set 314 to, and stores the result set 314 on, cloud storage 316, an average production time for producing the result set 314 is decreased by caching the result set 314 in cloud storage 316. Thus, the average time it takes for the client to retrieve the result set 314 from cloud storage 316 is decreased, thereby speeding up the entire query process. It will be appreciated that the average production time is decreased because while the first time the result set 314 is produced may take about the same amount of time, subsequent production time for the result set 314 is dramatically reduced or even eliminated because of the caching of the result set 314 in cloud storage 316. In an implementation, the execution platform 312 automatically sends the generated plurality of chunks 315 to cloud storage 316 as the remaining chunks 315 of the result set 314 are being produced.

In an implementation of result set consumption and in a scenario where a client knows the query ID of a query, the result API can be used to fetch the result set 314 after the query has been completed. In a scenario where a client does not know the query ID of a query, metadata commands may be used to list the last N query IDs for which there are result sets 314 stored and to fetch the result set given a query ID. The resource manager 302 may generate preassigned URLs for the additional chunks 315. Additionally, metadata will be included for these chunks 315 in the result set 314 so that clients will know how to consume them. Because consumption of the result set 314 may be asynchronous, the client or user can consume the result from a different machine or client than from which a query is submitted. The client or user can consume the result at a different time from when a query produces the result set 314. The user can also go back to a result set 314 after it has been produced. Further, query result sets 314 can be audited and query result sets 314 can be shared.

In an implementation, the systems and methods of the disclosure may enable scrolling such that the client can scroll through the result set 314 by requesting delivery of a specific chunk of the plurality of chunks 315 for consumption. For a client to determine which file to fetch to support scrolling, a file index may be calculated based on the chunk statistics. By way of example, assume there is a result set that has a first chunk 315a with row range of 1-10,000; and additional chunks 315 as follows: chunk 2 has a row range of 10,001-100,000, and chunk 3 has a row range of 100,001-100,981. Further assume that a client wants to return rows with pages of 1000 rows. The client would start the consumption process by consuming the first chunk 315a and then fetching the second and third chunks 315 from cloud storage 316, such as s3, using presigned URLs and return rows from cloud storage 316. It will be appreciated that a page might need to be built with rows from two consecutive chunks 315.

In an implementation of the systems and methods of the disclosure, the resource manager module 302 may operate to clean the result set 314 stored in cloud storage 316. The resource manager 302 may clean the result set 314 by setting an expiration date for the result set 314 as discussed more fully below. Additionally, the resource manager 302 may clean the result set 314 by setting system wide result set lifecycle policies to remove unwanted result sets 314. Further, the resource manager 302 may clean the result set 314 by setting required and omitted computer network pipes.

In an implementation, unlike table data, result sets 314 may need to be purged automatically after they expire. An account attribute may be added to the result set 314 to indicate how long a result set 314 will be stored (e.g., #days). Dedicated threads may be added in the resource manager 302 to go through the result set 314 metadata periodically and purge the result sets 314 that have exceeded the expiry time and update the job metadata about the result set status. The purging process may be optimized by storing slices from mapping year/month/day to result sets 314 for quickly finding result sets 314 based on the year/month/day attributes. Thus, expiry time may be limited to using #days/months/years as units.

In an implementation of the systems and methods of the disclosure, the execution platform module 312 may build a first class object database. The execution platform module 312 may store previous queries as a first class database object, thereby providing the ability to query results of previous queries. The building of the first class object database enables the client to audit the queries and result sets 314 of said queries. It also enables the client to share the queries and result sets 314 of said queries. Further, the execution platform module 312 may also categorize the queries in the first class object database and returns multiple result sets in response to the query.

Figure 4:
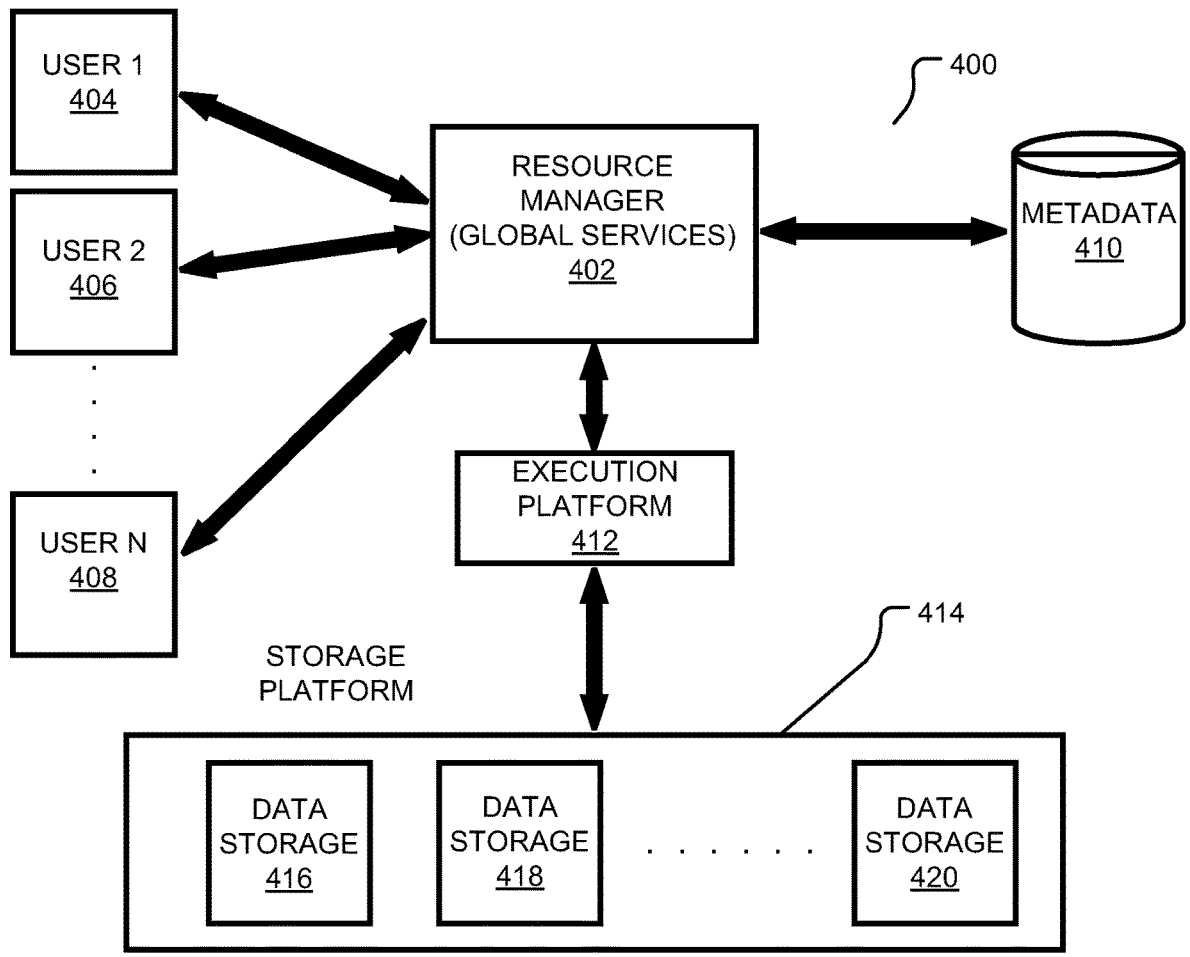
FIG. 4 illustrates a block diagram of components of a retrieval and data storage system.

Referring now to FIG. 4, a computer system is illustrated for running the methods disclosed herein. As shown in FIG. 4, resource manager 402 may be coupled to multiple users 404, 406, and 408. In particular implementations, resource manager 402 can support any number of users desiring access to data processing platform 400. Users 404, 406, 408 may include, for example, end users providing data storage and retrieval requests, system administrators managing the systems and methods described herein, and other components/devices that interact with resource manager 402.

Resource manager 402 provides various services and functions that support the operation of all systems and components within data processing platform 400. Resource manager 402 may be coupled to metadata 410, which is associated with the entirety of data stored throughout data processing platform 400. In some embodiments, metadata 410 may include a summary of data stored in remote data storage systems as well as data available from a local cache. Additionally, metadata 410 may include information regarding how data is organized in the remote data storage systems and the local caches. Metadata 410 may allow systems and services to determine whether a piece of data needs to be processed without loading or accessing the actual data from a storage device.

Resource manager 402 may be further coupled to the execution platform 412, which provides multiple computing resources that execute various data storage and data retrieval tasks, as discussed in greater detail below. Execution platform 412 may be coupled to multiple data storage devices 416, 418, and 420 that are part of a storage platform 414. Although three data storage devices 416, 418, and 420 are shown in FIG. 4, execution platform 412 is capable of communicating with any number of data storage devices. In some embodiments, data storage devices 416, 418, and 420 are cloud-based storage devices located in one or more geographic locations. For example, data storage devices 416, 418, and 420 may be part of a public cloud infrastructure or a private cloud infrastructure. Data storage devices 416, 418, and 420 may be hard disk drives (HDDs), solid state drives (SSDs), storage clusters or any other data storage technology. Additionally, storage platform 414 may include distributed file systems (such as Hadoop Distributed File Systems (HDFS)), object storage systems, and the like.

In particular embodiments, the communication links between resource manager 402 and users 404, 406, 408, metadata 410, and execution platform 412 are implemented via one or more data communication networks. Similarly, the communication links between execution platform 412 and data storage devices 416, 418, 420 in storage platform 414 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 4, data storage devices 416, 418, and 420 are decoupled from the computing resources associated with execution platform 412. This architecture supports dynamic changes to data processing platform 400 based on the changing data storage/retrieval needs as well as the changing needs of the users and systems accessing data processing platform 400. The support of dynamic changes allows data processing platform 400 to scale quickly in response to changing demands on the systems and components within data processing platform 400. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 402, metadata 410, execution platform 412, and storage platform 414 are shown in FIG. 4 as individual components. However, each of resource manager 402, metadata 410, execution platform 412, and storage platform 414 may be implemented as a distributed system (e.g., distributed across multiple systems/platforms at multiple geographic locations). Additionally, each of resource manager 402, metadata 410, execution platform 412, and storage platform 414 can be scaled up or down (independently of one another) depending on changes to the requests received from users 404, 406, 408 and the changing needs of data processing platform 400. Thus, data processing platform 400 is dynamic and supports regular changes to meet the current data processing needs.

Figure 5:
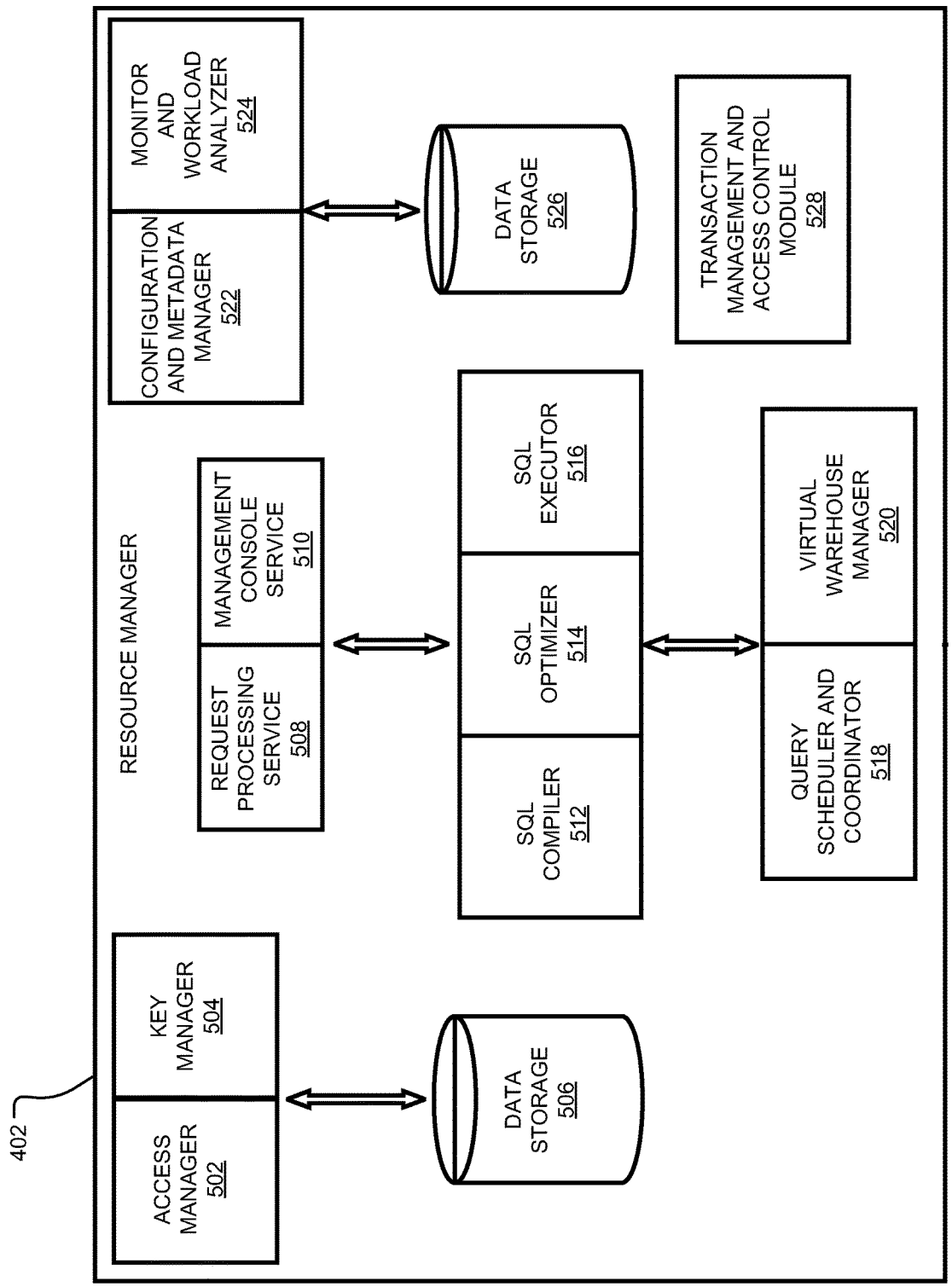
FIG. 5 illustrates a block diagram depicting an embodiment of a resource manager in accordance with the teachings and principles of the disclosure.

FIG. 5 is a block diagram depicting an embodiment of resource manager 402. As shown in FIG. 4, resource manager 402 includes an access manager 502 and a key manager 504 coupled to a data storage device 506. Access manager 502 may handle authentication and authorization tasks for the systems described herein. Key manager 504 may manage storage and authentication of keys used during authentication and authorization tasks. A request processing service 508 manages received data storage requests and data retrieval requests. A management console service 510 supports access to various systems and processes by administrators and other system managers.

Resource manager 402 may also include an SQL compiler 512, an SQL optimizer 514 and an SQL executor 510. SQL compiler 512 parses SQL queries and generates the execution code for the queries. SQL optimizer 514 determines the best method to execute queries based on the data that needs to be processed. SQL executor 516 executes the query code for queries received by resource manager 402. A query scheduler and coordinator 518 may send received queries to the appropriate services or systems for compilation, optimization, and dispatch to the execution platform 412. A virtual warehouse manager 520 manages the operation of multiple virtual warehouses implemented in an execution platform.

Additionally, resource manager 402 includes a configuration and metadata manager 522, which manages the information related to the data stored in the remote data storage devices and in the local caches. A monitor and workload analyzer 524 oversees the processes performed by resource manager 402 and manages the distribution of tasks (e.g., workload) across the virtual warehouses and execution nodes in the execution platform. Configuration and metadata manager 522 and monitor and workload analyzer 524 are coupled to a data storage device 526.

Resource manager 402 also includes a transaction management and access control module 528, which manages the various tasks and other activities associated with the processing of data storage requests and data access requests. For example, transaction management and access control module 528 provides consistent and synchronized access to data by multiple users or systems. Since multiple users/systems may access the same data simultaneously, changes to the data must be synchronized to ensure that each user/system is working with the current version of the data. Transaction management and access control module 528 provides control of various data processing activities at a single, centralized location in resource manager 402.

Figure 6:
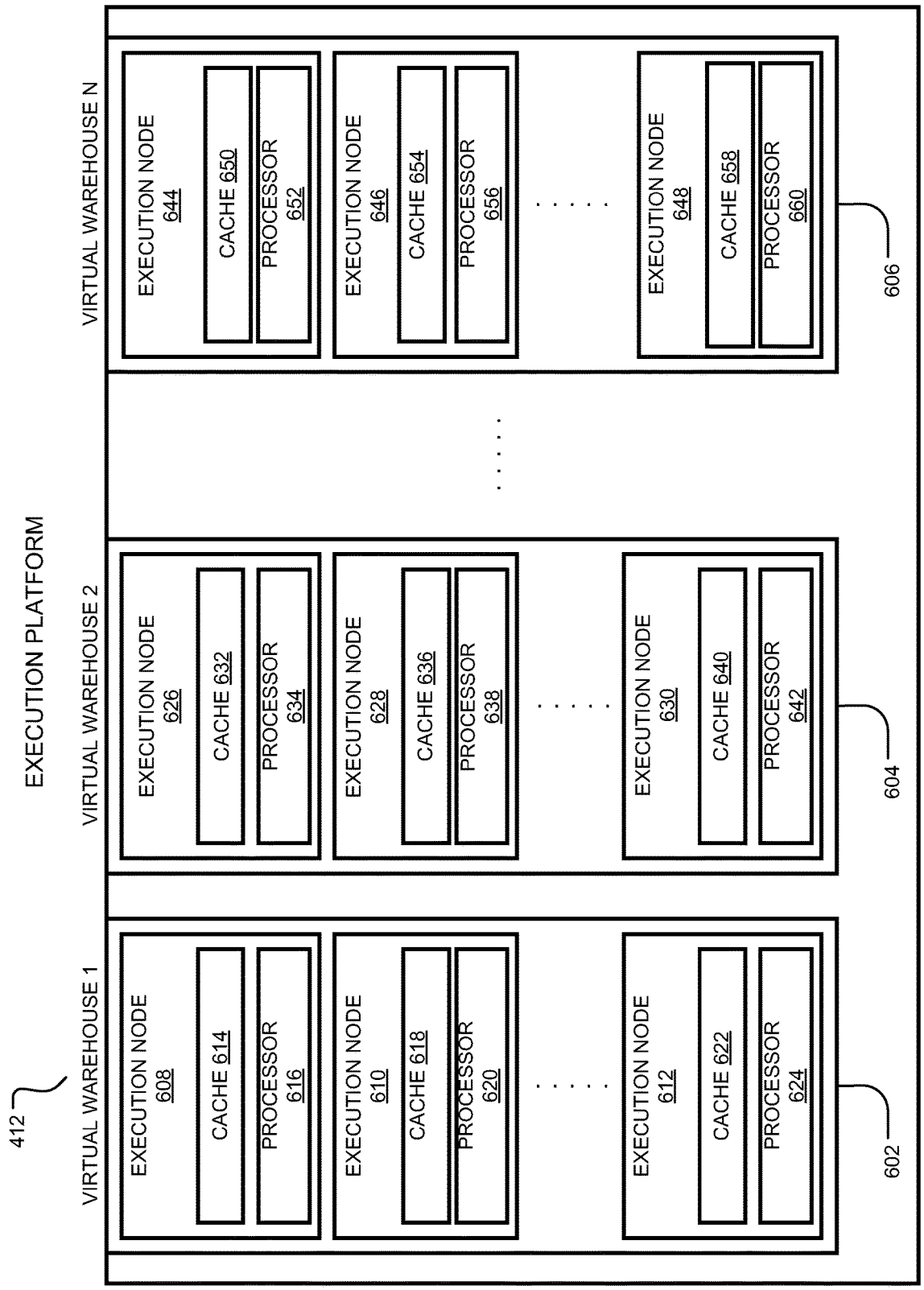
FIG. 6 illustrates a block diagram depicting an embodiment of an execution platform in accordance with the teachings and principles of the disclosure.

FIG. 6 is a block diagram depicting an embodiment of an execution platform. As shown in FIG. 6, execution platform 412 includes multiple virtual warehouses 602, 604, and 606. Each virtual warehouse includes multiple execution nodes that each includes a cache and a processor. Although each virtual warehouse 602, 604, 606 shown in FIG. 6 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 602, 604, 606 is capable of accessing any of the data storage devices 416, 418, 420 shown in FIG. 4. Thus, virtual warehouses 602, 604, 606 are not necessarily assigned to a specific data storage device 416, 418, 420 and, instead, can access data from any of the data storage devices 416, 418, 420. Similarly, each of the execution nodes shown in FIG. 6 can access data from any of the data storage devices 416, 418, 420. In some embodiments, a particular virtual warehouse or a particular execution node may be temporarily assigned to a specific data storage device, but the virtual warehouse or execution node may later access data from any other data storage device.

In the example of FIG. 6, virtual warehouse 602 includes three execution nodes 608, 610, and 612. Execution node 608 includes a cache 614 and a processor 616. Execution node 610 includes a cache 618 and a processor 620. Execution node 612 includes a cache 622 and a processor 624. Each execution node 608, 610, 612 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 602 discussed above, virtual warehouse 604 includes three execution nodes 626, 628, and 630. Execution node 626 includes a cache 632 and a processor 634. Execution node 628 includes a cache 636 and a processor 638. Execution node 630 includes a cache 640 and a processor 642. Additionally, virtual warehouse 606 includes three execution nodes 644, 646, and 648. Execution node 644 includes a cache 650 and a processor 652. Execution node 646 includes a cache 654 and a processor 656. Execution node 648 includes a cache 658 and a processor 660.

Although the execution nodes shown in FIG. 6 each include one cache and one processor, alternative embodiments may include execution nodes containing any number of processors and any number of caches. Additionally, the caches may vary in size among the different execution nodes. The caches shown in FIG. 6 store, in the local execution node, data that was retrieved from one or more data storage devices in a storage platform 414 (see FIG. 4). Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in storage platform 414.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 602, 604, 606 are associated with the same execution platform 412 of FIG. 4, the virtual warehouses may be implemented using multiple computing systems at multiple geographic locations. For example, virtual warehouse 602 can be implemented by a computing system at a first geographic location, while virtual warehouses 604 and 606 are implemented by another computing system at a second geographic location. In some embodiments, these different computing systems are cloud-based computing systems maintained by one or more different entities.

Additionally, each virtual warehouse is shown in FIG. 6 as having multiple execution nodes. The multiple execution nodes associated with each virtual warehouse may be implemented using multiple computing systems at multiple geographic locations. For example, a particular instance of virtual warehouse 602 implements execution nodes 608 and 610 on one computing platform at a particular geographic location, and implements execution node 612 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. Execution platform 412 is also fault tolerant. For example, if one virtual warehouse fails, that virtual warehouse is quickly replaced with a different virtual warehouse at a different geographic location.

A particular execution platform 412 may include any number of virtual warehouses 602, 604, 606. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 7:
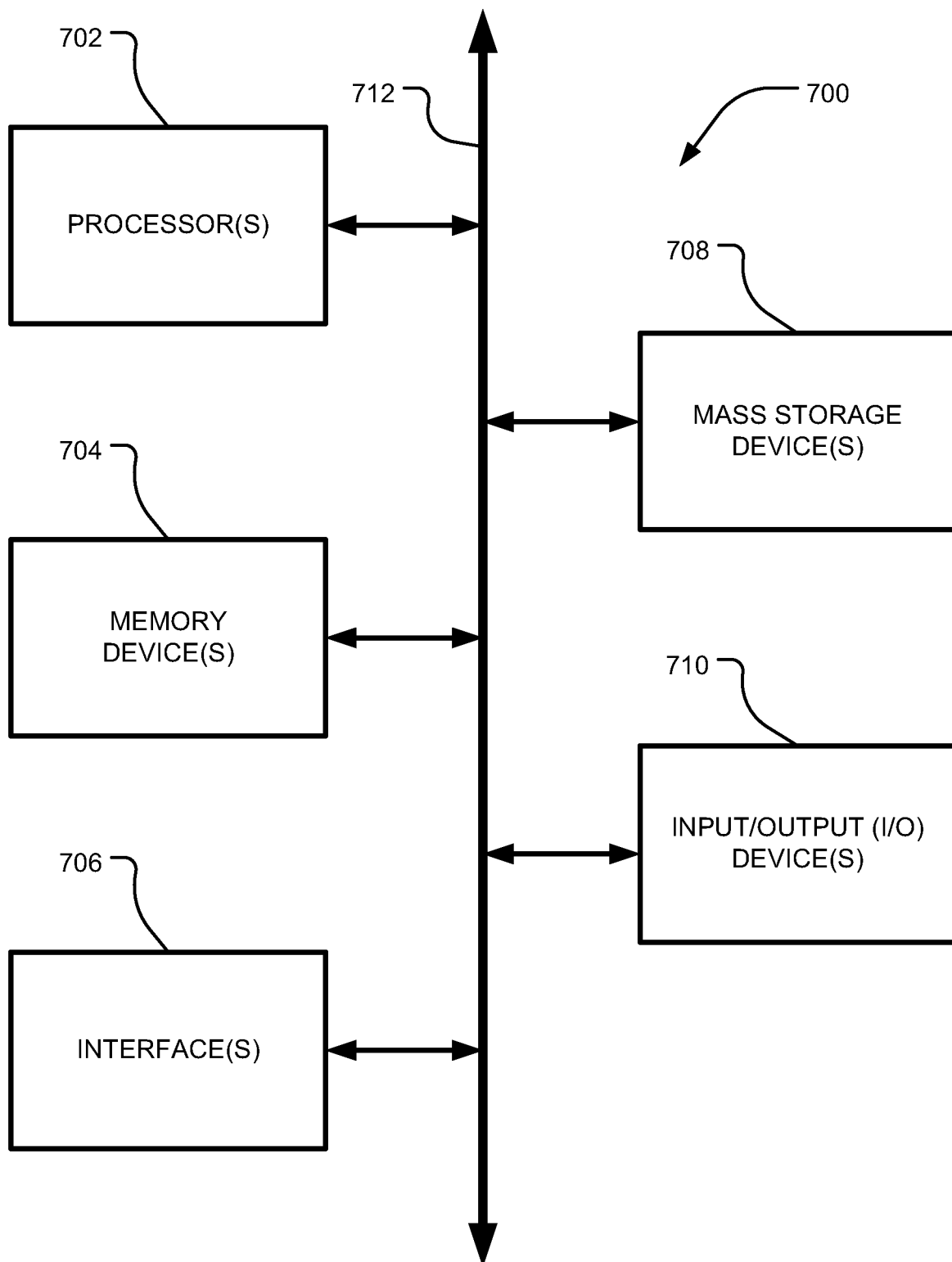
FIG. 7 is a block diagram depicting an example computing device consistent with the enabling disclosure of the computer processes taught herein.

FIG. 7 is a block diagram depicting an example computing device 700. In some embodiments, computing device 700 is used to implement one or more of the systems and components discussed herein. For example, computing device 700 may allow a user or administrator to access the resource manager 402. Further, computing device 700 may interact with any of the systems and components described herein. Accordingly, computing device 700 may be used to perform various procedures and tasks, such as those discussed herein. Computing device 700 can function as a server, a client or any other computing entity. Computing device 700 can be any of a wide variety of computing devices, such as a desktop computer, a notebook computer, a server computer, a handheld computer, a tablet, and the like.

Computing device 700 includes one or more processor(s) 702, one or more memory device(s) 704, one or more interface(s) 706, one or more mass storage device(s) 708, and one or more Input/Output (I/O) device(s) 710, all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) and/or nonvolatile memory (e.g., read-only memory (ROM)). Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. Various drives may also be included in mass storage device(s) 708 to enable reading from and/or writing to the various computer readable media. Mass storage device(s) 708 include removable media and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Interface(s) 706 include various interfaces that allow computing device 700 to interact with other systems, devices, or computing environments. Example interface(s) 706 include any number of different network interfaces, such as interfaces to local area networks (LANs), wide area networks (WANs), wireless networks, and the Internet.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware, for the purposes of performing all or parts of query operations.

Figure 8:
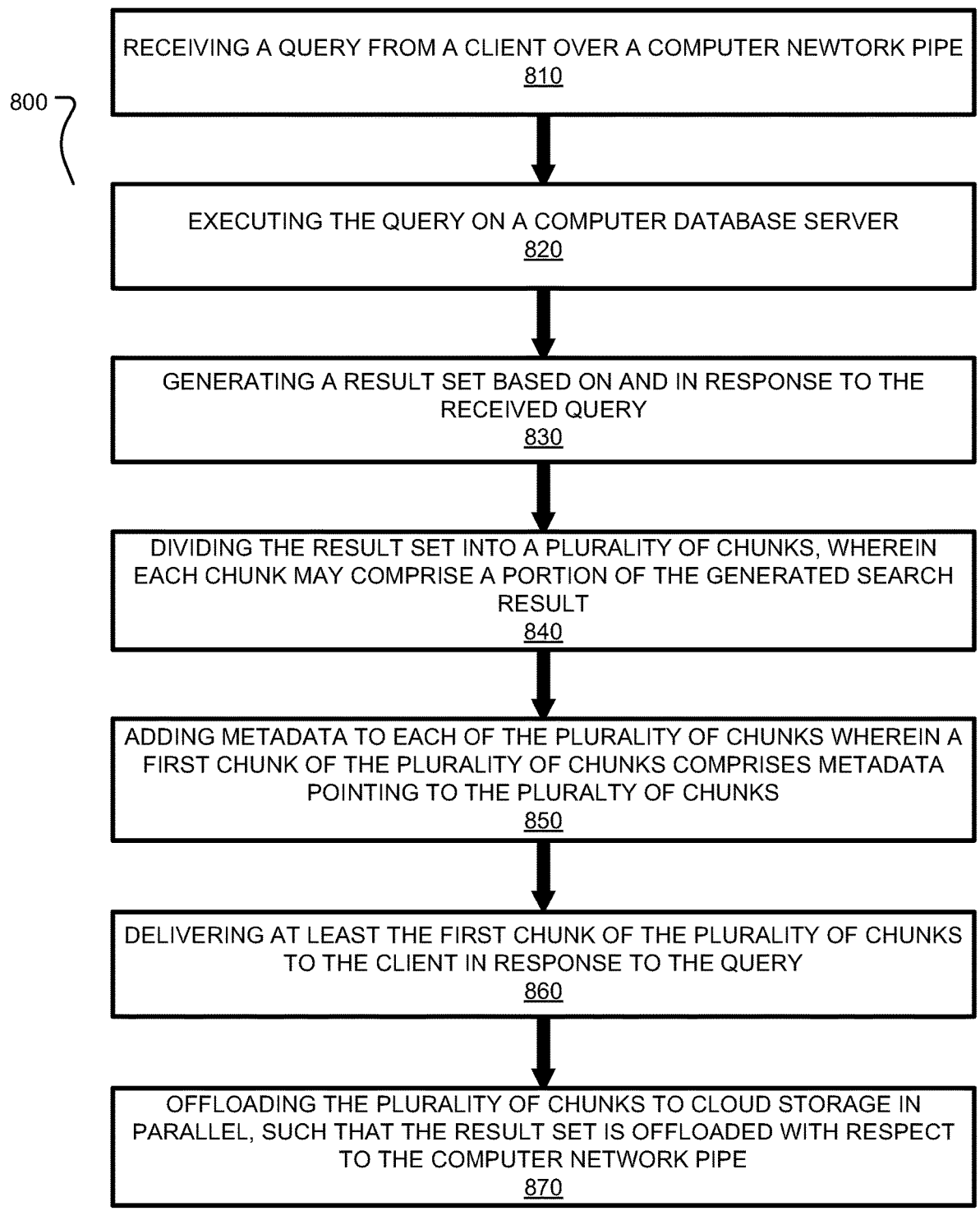
FIG. 8 illustrates a flow chart depicting an implementation of a method for managing a persistent or large query result set in accordance with the teachings and principles of the disclosure.

Referring now to FIG. 8, there is illustrated a flow chart depicting an implementation of a method 800 for managing a persistent query result set in a computer system having a plurality of data file sets stored in computer accessible storage. The method 800 may comprise receiving a query from a client over a computer network pipe at 810. At 820, the method may comprise executing the query on a computer database server. The method may further comprise generating a result set based on and in response to the received query at 830. At 840, the method may comprise dividing the result set into a plurality of chunks. Each chunk may comprise a portion of the generated result set. To generate individual chunks, the execution platform processes the rows by batch. At the end of each batch, the size of the generated result is checked and compared with the max chunk size limit. If the max chunk size limit is reached, then the system and method enqueues a job to upload the result chunk asynchronously to cloud storage. The max chunk size starts from 100 KB and increases by a factor of 10 when the total result size reaches certain thresholds (such as 10 MB and 1 GB respectfully). At 850, the method may further comprise adding metadata to each of the plurality of chunks. It will be appreciated that a first chunk of the plurality of chunks may comprise metadata pointing to the plurality of chunks. At 860, the method may comprise delivering at least the first chunk of the plurality of chunks to the client in response to the query. At 870, the method may comprise offloading the plurality of chunks to cloud storage in parallel, such that the result set is offloaded with respect to the computer network pipe.

Figure 9:
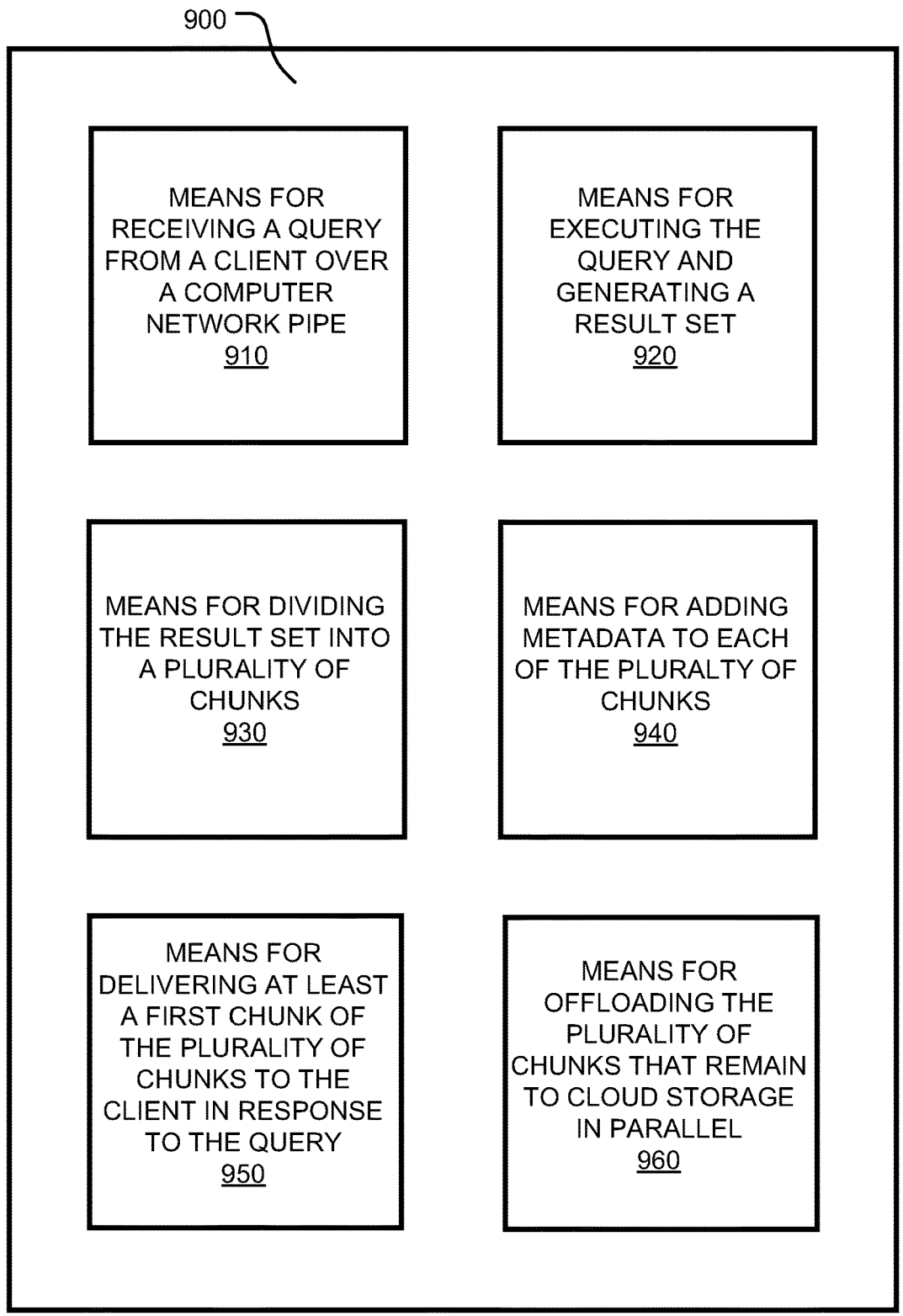
FIG. 9 illustrates an implementation of a system for managing a persistent or large query result set in accordance with the teachings and principles of the disclosure.

Referring now to FIG. 9, there is illustrated an implementation of a system for managing a persistent query result set. In an implementation, the system 900 may comprise a means for receiving a query from a client over a computer network pipe 910. In the implementation, the system 900 may further comprise a means for executing the query and generating a result set based on and in response to the received query 920. In the implementation, the system 900 may further comprise a means for dividing the result set into a plurality of chunks 930, wherein each chunk comprises a portion of the generated result set. In the implementation, the system 900 may further comprise a means for adding metadata to each of the plurality of chunks 940, wherein a first chunk of the plurality of chunks comprises metadata pointing to the plurality of chunks. In the implementation, the system 900 may further comprise a means for delivering at least the first chunk of the plurality of chunks to the client in response to the query 950. In the implementation, the system 900 may further comprise a means for offloading the plurality of chunks that remain to cloud storage in parallel 960, such that the result set is offloaded with respect to the computer network pipe. It will be appreciated that the structures disclosed herein for managing a persistent query result set are merely exemplary of various means for accomplishing the functional result specified. It should be appreciated that any structure, apparatus or system for accomplishing the functional result specified for managing a persistent query result set that performs functions the same as, or equivalent to, those disclosed herein are intended to fall within the scope of the disclosure, including those structures, apparatus or systems for accomplishing the functional result specified, which are presently known, or which may become available in the future. Anything which functions the same as, or equivalently to the specified means falls within the scope of this disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method of managing a persistent query result set in a computer system having a plurality of data file sets stored in computer accessible storage, the method comprising:
   receiving a database query from a client over a computer network;
   determining a first result for a first portion of the database query;
   offloading the first result to cloud storage, the persistent query result set includes a plurality of result chunks, the first result is one of the plurality of result chunks, and the first result includes metadata referencing other chunks in the plurality of result chunks;
   providing a first result pointer to the client such that the client may access the first result from the cloud storage based on the first result pointer, wherein the first result pointer comprises data in a manifest file listing a compressed version of data files and rows contained in the first result; and
   determining a second result for a second portion of the database query, the second result is one of the plurality of result chunks;
   wherein the client may access the first result from the cloud storage in parallel with the determining the second result for the second portion, and wherein the second result chunk is obtained using the metadata referencing the other chunks in the plurality of result chunks from the first result; and
   wherein execution of the database query is decoupled from consumption by the client of a result of the database query.

2. The method of claim 1, wherein the first result and the second result are accessible to the client simultaneously through multiple computer network pipes, such that the first result and the second result are downloadable by the client asynchronously and in parallel thereby decreasing database server resource requirements and increasing the client's speed of retrieving any result portion for the database query.

3. The method of claim 1, further comprising caching the first result in cloud storage.

4. The method of claim 1, wherein generation of the second result is not limited by a speed of the client consuming or downloading the first result.

5. The method of claim 1, further comprising generating a third result for a third portion of the database query in parallel with the client downloading either of the first result or the second result, the third result is one of the plurality of result chunks.

6. The method of claim 1, further comprising cleaning the first result in the cloud storage.

7. The method of claim 6, wherein a resource manager cleans the first result stored in the cloud storage.

8. The method of claim 7, wherein cleaning the first result comprises setting an expiration date for the first result such that the client can no longer access the first result after the expiration date has passed.

9. The method of claim 7, wherein cleaning the first result comprises setting system wide result set lifecycle policies to remove unwanted result sets.

10. The method of claim 7, wherein cleaning the first result comprises setting required and omitted computer network pipes.

11. The method of claim 7, wherein an execution platform determines the first result and the second result, wherein the determining of the first result and the second result are performed by different execution nodes of the execution platform.

12. The method of claim 1, wherein a resource manager automatically adds metadata to each of a plurality of results as the plurality of results is being produced.

13. The method of claim 1, wherein an execution platform automatically offloads the first result to cloud storage in parallel with the determining the second result.

14. The method of claim 1, wherein the first result and the second result are stored in the cloud storage such that the client can download the first result and the second result at the same time or at different times.

15. The method of claim 14, further comprising processing a plurality of results for a plurality of portions of the database query in parallel when the client is disconnected from a database server in communication with the cloud storage.

16. The method of claim 1, further comprising enabling the client to scroll through one or more results of the database query by requesting delivery of a specific result portion such that the specific result portion relevant to the client's request is delivered to the client for consumption.

17. The method of claim 1, further comprising enabling the client to download the first result from a different computing machine than from which the database query was sent.

18. The method of claim 1, further comprising building a first class object database and storing previous database queries as a first class database object such that one or more results to the previous database queries may be queried and retrieved.

19. The method of claim 18, further comprising enabling the client to audit any result portion to the database query.

20. The method of claim 18, further comprising enabling the client to share the database query and any result portion for the database query.

21. The method of claim 18, further comprising categorizing queries in the first class object database and returning multiple result sets in response to the database query.

22. A system comprising:
   memory; and
   one or more processors operatively coupled to the memory, the one or more processors to:
      receive a database query from a client over a computer network, the database query directed to data stored in a plurality of storage devices that store sets of digital files that are distributed over the plurality of storage devices; and
      determine, by an execution platform, a first result for a first portion of the database query,
      wherein the execution platform offloads the first result to cloud storage, the persistent query result set includes a plurality of result chunks, the first result is one of the plurality of result chunks, and the first result includes metadata referencing other chunks in the plurality of result chunks;
provide a first result pointer to the client such that the client may access the first result from the cloud storage based on the first result pointer, wherein the first result pointer comprises data in a manifest file listing a compressed version of data files and rows contained in the first result;
determine, by the execution platform, a second result for a second portion of the database query, the second result is one of the plurality of result chunks;
wherein the client may access the first result from the cloud storage in parallel with the determining the second result for the second portion, and wherein the second result chunk is obtained using the metadata referencing the other chunks in the plurality of result chunks from the final result; and
wherein execution of the database query by the execution platform is decoupled from consumption by the client of a result of the database query.

23. The system of claim 22, wherein the first result and the second result are accessible to the client simultaneously through multiple computer network pipes, such that the first result and the second result are downloadable by the client asynchronously and in parallel thereby decreasing database server resource requirements and increasing the client's speed of retrieving either of the first result or the second result.

24. The system of claim 22, wherein the one or more processors cache the first result in cloud storage.

25. The system of claim 22, wherein generation of the second result by the execution platform is not limited by a speed of the client consuming or downloading the first result.

26. The system of claim 22, wherein the one or more processors further generate a third result for a third portion of the database query in parallel with the client downloading either of the first result or the second result, the third result is one of the plurality of result chunks.

27. The system of claim 22, wherein one or more processors further clean the first result stored in the cloud storage.

28. The system of claim 27, wherein to clean the first result, the one or more processors are to set an expiration date for the first result such that the client can no longer access the first result after the expiration date has passed.

29. The system of claim 27, wherein to clean the first result, the one or more processors are to set system wide result set lifecycle policies to remove unwanted result sets.

30. The system of claim 27, wherein to clean the first result, the one or more processors are to set required and omitted computer network pipes.

31. The system of claim 22, wherein the determining of the first result and the second result are performed by different execution nodes of the execution platform.

32. The system of claim 22, wherein the one or more processors offload any finished result of the database query to cloud storage as any remaining results of the database query are being determined.

33. The system of claim 22, wherein the first result and the second result are stored in the cloud storage such that the client can download the first result and the second result at the same time or at different times.

34. The system of claim 33, wherein the one or more processors process a plurality of results for a plurality of portions of the database query in parallel when the client is disconnected from a database server in communication with the cloud storage.

35. The system of claim 22, wherein the client scrolls through one or more results of the database query by requesting delivery of a specific result portion such that the specific result portion relevant to the client's request is delivered to the client for consumption.

36. The system of claim 22, wherein the client downloads the first result from a different computing machine than from which the query was sent.

37. The system of claim 22, wherein the one or more processors are further to build a first class object database and store previous database queries as a first class database object such that one or more results to the previous database queries may be queried and retrieved.

38. The system of claim 37, wherein the client audits any result portion to the database query.

39. The system of claim 37, wherein the client shares the database query and any result portion of the database query.

40. The system of claim 37, wherein the one or more processors categorize the queries in the first class object database and return multiple result sets in response to the database query.

41. A non-transitory computer-readable medium having instructions stored thereon which, when executed by one or more processors, cause the one or more processors to:
receive a database query from a client over a computer network;
determine a first result for a first portion of the database query;
offload the first result to cloud storage, a persistent query result set includes a plurality of result chunks, the first result is one of the plurality of result chunks, and the first result includes metadata referencing other chunks in the plurality of result chunks;
provide a first result pointer to the client such that the client may access and/or download the first result from the cloud storage based on the first result pointer, wherein the first result pointer comprises data in a manifest file listing a compressed version of data files and rows contained in the first result; and
determine a second result for a second portion of the database query, the second result is one of the plurality of result chunks;
wherein the client may access the first result from the cloud storage in parallel with the determining the second result for the second portion, and wherein the second result chunk is obtained using the metadata referencing the other chunks in the plurality of result chunks from the first result; and
wherein execution of the database query is decoupled from consumption by the client of a result of the database query.

42. The non-transitory computer-readable medium of claim 41, wherein the first result and the second result are accessible to the client simultaneously through multiple computer network pipes, such that the first result and the second result are downloadable by the client asynchronously and in parallel thereby decreasing database server resource requirements and increasing the client's speed of retrieving any result portion for the database query.

43. The non-transitory computer-readable medium of claim 41, wherein the one or more processors are to:
cache the first result in cloud storage.

44. The non-transitory computer-readable medium of claim 41, wherein the determining the second result is not limited by a speed of the client consuming or downloading the first result.

45. The non-transitory computer-readable medium of claim 41, wherein the one or more processors are further to:
generate a third result for a third portion of the database query in parallel with the client downloading any processed result portion for the database query, the third result is one of the plurality of result chunks.

46. The non-transitory computer-readable medium of claim 41, wherein the one or more processors are further to:
clean the first result in the cloud storage.

47. The non-transitory computer-readable medium of claim 46, wherein the one or more processors clean the first result in the cloud storage by a resource manager.

48. The non-transitory computer-readable medium of claim 47, wherein to clean the first result, the one or more processors are to set an expiration date for the first result such that the client can no longer access the first result after the expiration date has passed.

49. The non-transitory computer-readable medium of claim 47, wherein to clean the first result, the one or more processors are to set system wide result set lifecycle policies to remove unwanted result sets.

50. The non-transitory computer-readable medium of claim 47, wherein to clean the first result, the one or more processors are to set required and omitted computer network pipes.

51. The non-transitory computer-readable medium of claim 41, wherein the computing device comprises one or more execution nodes in an execution platform.

52. The non-transitory computer-readable medium of claim 41, wherein the one or more processors are further to:
add metadata to each of a plurality of results as the plurality of results is are being produced.

53. The non-transitory computer-readable medium of claim 41, wherein the one or more processors are further to:
offload the first result to cloud storage in parallel with the means for determining the second result performing the determining of the second result.

54. The non-transitory computer-readable medium of claim 41, wherein the first result and the second result are stored in the cloud storage such that the client can download the first result and the second result at the same time or at different times.

55. The non-transitory computer-readable medium of claim 54, wherein the one or more processors are further to:
process a plurality of results for a plurality of portions of the database query in parallel when the client is disconnected from a database server in communication with the cloud storage.

56. The non-transitory computer-readable medium of claim 41, wherein the one or more processors are further to:
enable the client to scroll through one or more result portions of the database query by requesting delivery of a specific result portion such that the specific result portion relevant to the client's request is delivered to the client for consumption.

57. The non-transitory computer-readable medium of claim 41, wherein the one or more processors are further to:
enable the client to download the first result from a different computing machine than from which the database query was sent.

58. The non-transitory computer-readable medium of claim 41, wherein the one or more processors are further to:
build a first class object database and storing previous database queries as a first class database object such that one or more results to the previous database queries may be queried and retrieved.

59. The non-transitory computer-readable medium of claim 58, wherein the one or more processors are further to:
enable the client to audit any result portion to the database query.

60. The non-transitory computer-readable medium of claim 58, wherein the one or more processors are further to:
enable the client to share the database query and any result portion for the database query.

61. The non-transitory computer-readable medium of claim 58, wherein the one or more processors are further to:
categorize queries in the first class object database and returning multiple result sets in response to the database query.

* * * * *

UNITED STATES PATENT AND TRADEMARK OFFICE
CERTIFICATE OF CORRECTION

PATENT NO. : 10,671,605 B2
APPLICATION NO. : 15/097107
DATED : June 2, 2020
INVENTOR(S) : Dageville et al.

It is certified that error appears in the above-identified patent and that said Letters Patent is hereby corrected as shown below:

In the Drawings

In Fig. 8, and on the title page, the illustrative print figure, Line 3, reference numeral 850, please replace "PLURALTY" with --PLURALITY--

In Fig. 9, Line 3, reference numeral 940, please replace "PLURALTY" with --PLURALITY--

In the Claims

In Column 18, Line 13, please replace "claim 7" with --claim 1--

In Column 18, Line 56, please replace "memory;" with --a memory;--

In Column 19, Line 19, please replace "final" with --first--

In Column 19, Line 42, please replace "wherein" with --wherein the--

In Column 21, Line 36, please replace "is are" with --is--

Signed and Sealed this
Thirtieth Day of January, 2024

Katherine Kelly Vidal
*Director of the United States Patent and Trademark Office*